United States Patent [19]

Goel

[11] Patent Number: 4,661,539

[45] Date of Patent: Apr. 28, 1987

[54] SAG RESISTANT TWO-COMPONENT EPOXY STRUCTURAL ADHESIVE

[75] Inventor: Anil B. Goel, Worthington, Ohio

[73] Assignee: Ashland Oil, Inc., Ashland, Ky.

[21] Appl. No.: 842,586

[22] Filed: Mar. 21, 1986

[51] Int. Cl.⁴ .......................... C08K 3/36; C08K 3/34
[52] U.S. Cl. .................................. 523/400; 523/443; 523/451; 523/466; 524/906
[58] Field of Search ............... 523/443, 466, 400, 451; 524/906

[56] References Cited

U.S. PATENT DOCUMENTS

| | | | |
|---|---|---|---|
| 3,396,138 | 8/1968 | Weller | 523/466 |
| 4,320,047 | 3/1982 | Murphy et al. | 523/466 |
| 4,465,542 | 8/1984 | Furihata | 523/466 |

*Primary Examiner*—Lewis T. Jacobs
*Attorney, Agent, or Firm*—John F. Jones

[57] ABSTRACT

A two-component structural adhesive comprising a first epoxy component composed of an epoxy resin containing from 0.5 to 8% by weight based on the weight of the epoxy resin of fumed silica and a second hardener component composed of an amido amine, primary and secondary amines having tertiary amine groups or alkylene ether groups in the backbone, and a phenolic compound is disclosed.

8 Claims, No Drawings

SAG RESISTANT TWO-COMPONENT EPOXY STRUCTURAL ADHESIVE

This invention relates to two-component epoxy structural adhesive compositions both components of which have good shelf life and relatively low viscosities enabling them to be used in gravity feed applications, but which upon mixing rapidly develop an anti-sag character which is very useful in the application of said adhesive compositions to vertical surfaces and the like.

Most known two-component adhesives based on epoxy resins and amine hardeners either do not have gravity flow characteristics or else the gravity flowable individual components upon mixing do not build non-sag character. Other characteristics of many known two-component epoxy resin adhesives which have room for improvement include short pot life (open time), slow curing times and high curing temperatures. Prior art epoxy adhesives of this type usually lack properties such as thixotropy which result in the sagging of the adhesive before the complete curing (setting) of the adhesive bond occurs. Furthermore, two-component adhesive compositions based on epoxy resin/amine hardener are known to give brittle polymers in many cases. The usual inclusion of physical thixotropic agents into the prior art adhesives results in the loss of mobility of the individual epoxy resin and amine hardener components prior to mixing, thus, not permitting the gravity feed option.

I have discovered two component epoxy adhesive compositions which exhibit excellent adhesive performance in addition to the properties such as (1) low enough viscosities of both components to have gravity flow ability in each, (2) tolerance for wide mix ratios of the two components, (3) non-sagging behavior in the adhesive upon mixing the two components, (4) long room temperature open time (pot life), (5) rapid cure at temperatures of about 100 degrees C., (6) high flexibility and toughness in the final adhesive bond, (7) low moisture sensitivity, and (8) high adhesive performance with many types of substrate materials.

A variety of active hydrogen compounds including polyamines, polyacids, polymercaptans, polyphenols, polyamides and polyureas have been used as the curing agents for epoxy resins to give thermosetting polymers. Some of these epoxy resins with the aforementioned curing agents have been used in adhesive formulations. Although the cured polymers exhibit good adhesion properties towards structural substrates, including steel and thermoset plastics structures, these two-component formulations lack one or more of the following desired features of high performance adhesives: Individual components with low viscosities (generally less than 200,000 cps) enabling them to be used by gravity feed methods; non-critical mix ratios, possibility of foolproof mixing (plus or minus 50% variation in the proportion of components); non-sagging character of the mixed adhesive before gelation; reasonably long room temperature (applying temperature) open time (usually about 30 minutes); no need for rigorous surface preparation (cleaning, scratching, scrubbing, priming, etc.); high flexibility and tough adhesive bond with high shear and peel strengths at temperatures in the range of from about room temperature up to about 200 degrees F.; low hygroscopicity of the adhesive; high heat resistance (400 degrees F. for about 1 hour).

I have discovered that the addition of a small amount (0.5 to 8% by weight, based on total epoxy resin composition of fumed silica to the epoxy resin component) in a two-component epoxy resin adhesive formulation will achieve the above-mentioned desirable characteristics to the adhesive. The epoxy component to which the fumed silica is added can also contain regular fillers and additives such as talc, alumina, kaolin, etc. in amounts varying from 100 to 30% by weight and still maintain the gravity flow characteristics, however, upon mixing with the amine hardener component they will develop rapid non-sagging properties. This non-sagging behavior is best observed when the amine hardener component contains from 20 to 38% by weight of kaolin (Kaophile, an aluminum hydroxide modified kaolin) filler. Based on this discovery, several adhesive formulations have been developed as disclosed below.

The epoxy component of the two component epoxy adhesives of this invention is composed of an epoxy resin such as a liquid diglycidyl ether of Bisphenol-A having an epoxy equivalent weight of about 180-200, for instance, although other known epoxy resins may also be used. In order to improve the flexibility and the toughness of the final adhesive, a flexibilizer can be included in the epoxy resin component. Flexibilizers can include rubbers and urethane elastomers. For instance, an epoxy resin can be allowed to react with from 5 to 20% by weight of a commercially available carboxylic acid-terminated butadiene/acrylonitrile Hycar rubber (B. F. Goodrich) or be simply blended with a urethane elastomer. The epoxy resin component can be filled with known fillers such as talc, alumina, glass beads, kaolin, etc. to such an extent that they exhibit gravity flow properties (viscosity about 200,000 cps or lower). The filler levels depend largely on the viscosities of the unfilled resin and may be in the range of from about 0 to 35% by weight. The preferred fillers in addition to the required fumed silicas are talc and alumina. The system in accordance with this invention is then further filled with small amounts (0.5 to 8% by weight) of fumed silica. Optionally one can add to the epoxy resin component additional chemical thixotropic agents such as molecules with unsaturated multiple bonds capable of undergoing Michael addition reaction with amine (e.g., maleic or fumaric groups). Addition of these additives further improves the non-sagging behavior of the mixed adhesives. The amounts of additional additives in the epoxy resins for thixotropy should not exceed about 5% by weight. The precise amount of this type of thixotropy additive actually used depends upon the initial viscosity of the particular epoxy resins used. Optionally, low viscosity mono-, and polyepoxy materials such as phenyl glycidyl ether, butane diol diglycidyl ether, and the like, may be used to reduce the overall viscosity of the epoxy resin component.

Hardeners or curing agents which comprise the second component of the two component adhesive compositions of this invention are used for curing the epoxy resin component described above. The hardener component usually contains mixtures of amido amines, primary and secondary amines with tertiary amine groups or alkylene ether groups in the backbone and phenolics such as Bisphenol-A. In order to obtain high flexibility, toughness and improved water stability, the amido amines used can contain flexible groups and particularly the dimerized linoleic acid backbone. These materials may be obtained from commercial sources, e.g., Versamide 140 (the product of the reaction of dimer acid with aliphatic primary amines). In order to improve curing rate it is preferred to use either the amido amine containing tertiary amine group or the amido amine can be combined with amines such as 2-aminoethyl piperazine. The tertiary amine containing amido amine was prepared by the amidation of dimerized linoleic acid with either 2-aminoethyl piperazine or bis(aminopropyl) piperazine. Furthermore, in order to improve the rates of curing (phenolics and amines have synergistic rate improvement properties towards epoxy resins), flexibility, and toughness, polyphenolics such as Bisphenol-A can also be included in the hardener component. The active hydrogen equivalent weight of the hardener can be varied by adding different levels of poly(alkylene ether) diamine. This also helps to improve the flexibility and the adhesion properties of the adhesive. The amount (ratio) of amido amine: Bisphenol-A may be in the range of 30 to 90: 8 to 35: 2 to 35 weight percent.

Commonly known fillers such as talc, kaolin, metal oxides, metals, carbon, and the like can be used in both the epoxy resin and in the hardener components in the total overall range of from 10 to about 40% by weight.

Fumed silica is a colloidal form of silica made by combustion of silicon tetrachloride in hydrogen-oxygen furnaces. Fumed silica is a fine white powder which is also sometimes called Aerosil and is identified by other known commercial names.

The epoxy resins or polyepoxides useful in this invention can be monomeric or polymeric, saturated or unsaturated, aliphatic, cycloaliphatic, aromatic or heterocyclic and they may be substituted, if desired, with other substitutents besides epoxy groups, e.g., hydroxyl groups, ether radicals, halogen atoms, and the like. Typical epoxy components suitable in the practice of this invention include those disclosed in U.S. Pat. Nos. 2,500,600 and 2,324,483 which are incorporated here by reference. Preferred in this invention are 1,2-epoxy compounds having an epoxide equivalence greater than 2, that is to say, compounds containing more than one group of the formula

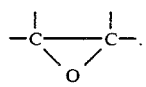

The 1,2-epoxide groups may be either terminal or inner ones. Particularly suitable terminal 1,2-epoxide groups are 1,2-epoxy ethyl or 1,2-epoxy propyl groups. The latter may be linked to an oxygen atom, that is to say, they are glycidyl ether or glycidyl ester groups. Compounds with inner epoxide groups usually contain the 1,2-epoxide group in an aliphatic chain or in a cycloaliphatic ring.

As epoxy compounds containing an inner 1,2-epoxy group there are suitable epoxidized diolefins, dienes, or cyclic dienes, such as 1,2,5,6-diepoxy hexane, 1,2,4,5-diepoxy cyclohexane, dicyclopentadiene diepoxide, dipentene diepoxide, vinyl cyclohexene diepoxide, epoxidized diolefinically unsaturated carboxylic acid esters, such as methyl 9,10,12,13-diepoxy stearate, or the dimethyl ester of 6,7,10,11-diepoxyhexadecane-1,16-dicarboxylic acid. Furthermore, there may be mentioned epoxidized mono-,di-, or polyesters, mono-, di-, or polyacetals containing at least one cycloaliphatic 5-membered or 6-membered ring, to which at least two 1,2-epoxidized groups are linked.

A widely used class of polyepoxides which can be used in this invention are the epoxy polyethers obtained by reacting a halogen containing epoxide of dihalohydrin, such as epichlorohydrin, epibromohydrin, 3-chloro-1,2-epoxyoctane, and the like with either a polyhydric phenol or a polyhydric alcohol.

This invention is further illustrated in the following representative examples.

EXAMPLE 1

This example gives the general procedure used for the preparation of adhesive bonds and for the testing of the adhesive bonds in accordance with this invention. The two components, i.e., the epoxy resin component and the hardener component, were mixed in appropriate weight amounts under an inert atmosphere (nitrogen) at room temperature. The resulting mixture was then applied in the form of a ⅜ inch bead across the substrate (i.e. sheet molding compound laminate) that measured 12 inches by 4 inches by 100 mils (thickness) and was dry wiped after sprinkling a few 30 mil diameter glass beads on the top of the adhesive to get a final glue line thickness of 30 mills, the other laminate sheet was placed on top of the first with a one-inch overlap. The sample was then cured in a heated fixture at 230 degrees F. under pressure of 1 psi for 4 minutes. The sample was then placed in an oven for post curing at 285 degrees F. for 30 minutes. Test specimens were then cut from these samples into one-inch strips.

The following tests were performed on the samples by using a set of at least three samples per test.

A. Shear strength test at room temperature after ½ hour postcuring at 285 degrees F.

B. Postbaking of sample at 400 degrees F. for an additional one hour and testing shear strength at room temperature.

C. Shear strength test at 180 degrees F. after 30 minutes of curing at 285 degrees F.

D. Shear strength test at room temperature on 285 degrees F. postcure samples after immersion for 24 hours in 206 degrees F. water.

EXAMPLE 2

An epoxy resin component was prepared by mixing 375.3 g of a liquid diglycidyl ether of Bisphenol-A (epoxy equivalent weight of 180–190), a carboxylic acid terminated butadiene/acrylonitrile copolymer (18% by weight acrylonitrile) (29 g) and 0.7 g of triphenyl phosphine. The resulting mixture was heated at 115 degrees C. for one hour to give a clear solution. The reaction temperature was then brought down to 70 degrees C. and 115 g of dry talc filler was added and was mixed thoroughly with a high shear mixer. To the resulting mixture was added 22 g of fumed silica and the resulting mixture was mixed vigorously. The final mixture was degassed under reduced pressure to give a creamy gravity flow liquid having a viscosity at 70 degrees F. of 194,000 cps.

EXAMPLE 3

A hardener component was prepared by mixing 84.1 g of bis-(aminopropyl) piperazine and 117.7 g of dimerized linoleic acid under nitrogen and the mixture was heated at 180 degrees C. for two hours. Water produced in the reaction was removed by distillation and the temperature was brought back to about 80 degrees C. To this mixture was added 68 g of amino ethyl piperazine, 128 g of poly (propylene ether) primary diamine (400 molecular weight) and 68 g of Bisphenol-A. The mixture was stirred for one hour at 60–70 degrees C. To this was added 220 g of dry Kaophile filler followed with vigorous mixing. The resulting mixture was degassed under reduced pressure to give a creamy liquid material having a room temperature viscosity of 160,000 cps.

EXAMPLE 4

A solution of 150 g of amido amine (reaction product of ethylene diamine with linoleic acid containing amide, amine and imidazoline groups), Bisphenol-A (50 g), aminoethyl piperazine (18 g), poly(propylene ether) diamine (400 molecular weight) (26.3 g), and bis(aminopropyl) piperazine (25 g) was prepared at 90 degrees C. This solution was filled with 225 g of dry Kaophile filler with mixing under high shear to give a creamy liquid hardener component having a room temperature viscosity of about 145,000 cps.

EXAMPLE 5

A solution of 134 g of aminoethyl piperazine, 136 g of poly (propylene ether) diamine (molecular weight of 400) and 134 g of Bisphenol-A was filled with 211 g of dry kaophile with high shear stirring to give a viscous liquid hardener-component having room temperature viscosity of about 177,000 cps.

EXAMPLE 6

Several combinations of the epoxy resin component of Example 2 and the hardener components of Examples 3, 4 and 5 were made in various weight ratios and the room temperature open time and the 230 degrees F. hot plate cure time for these combinations were studied. In each case mixing of the epoxy resin component and the hardener component resulted in an adhesive showing non-sag behavior (checked on a cardboard in a vertical manner). The results of these tests are given in Table 1.

TABLE 1

| Adhesive Cure (Example/Example) | Weight Ratio | Open Time (min) | 230° F. Time (min) |
| --- | --- | --- | --- |
| 2/3 | 1:1 | 65 | 3.5 |
| 2/3 | 1.5:1 | 70 | 3.7 |
| 2/4 | 1.5:1 | 80 | 4.0 |
| 2/5 | 1.5:1 | 80 | 4.0 |

EXAMPLE 7

The epoxy resin component of Example 1 and the hardener component of Example 3 were mixed in weight ratios of 1.25:1 and 1.5:1, respectively and the resulting mixtures were tested as adhesives on sheet molding compound (SMC) sample panels and also on primed (urethane primer) cold rolled steel panels. Upon mixing the two components a rapid non-sag character was built up in the adhesive. The adhesive bonds on the substrates were prepared according to the general procedure described above. A rapid green strength buildup was observed (determined by cross-peel test, i.e. applying the adhesive bead in the centre of two 1"×3" SMC panels to form a + shaped bond and pulling in the peel mode) showing strength of approximately 200 psi in three to four minutes in a heated fixture at 230 degrees F. The adhesive test procedure described earlier was used for testing and the results for SMC tests are given in Table 2.

TABLE 2

| Test Procedure | *Lap Shear Strength (psi) | |
| --- | --- | --- |
| | 1.25:1 Ratio | 1.5:1 Ratio |
| A | 540 | 690 |
| A | 640 | 670 |
| A | 560 | 764 |
| B | 610 | 660 |
| B | 580 | 680 |
| B | 560 | 590 |
| C | 898 | 720 |
| C | 730 | 683 |
| C | 780 | 710 |
| D | 692 | 444 |
| D | 542 | 472 |
| D | 575 | 445 |

*Delamination of the SMC substrate occurred in each test.

Test specimens made using cold rolled steel panels showed shear strengths in the range of from 2000–3200 psi.

EXAMPLE 8

The epoxy resin component of Example 2 and the amine hardener component of Example 5 were mixed in a 2:1 weight ratio to give an adhesive having non-sag behavior. The mixture was applied to three different commercial sheet molding compound panels and the tests used and results obtained are given in Table 3. The three commercial types of SMC are designated as "SMC A", "SMC B" and "SMC C" in Table 3.

TABLE 3

| Procedure | SMC A | SMC B | SMC C |
| --- | --- | --- | --- |
| B | 492 (DL) | 415 (SB) | 373 (DL) |
| B | 505 (DL) | 412 (DL) | 378 (DL) |
| B | 478 (DL) | 455 (DL) | 376 (DL) |
| C | 500 (DL) | 215 (DL) | 198 (SB) |
| C | 382 (DL) | 295 (DL) | 162 (SB) |
| C | 458 (DL) | 436 (DL) | 478 (DL) |
| D | 480 (DL) | 382 (DL) | 296 (DL) |
| D | 483 (DL) | 362 (DL) | 325 (DL) |
| D | 483 (DL) | 362 (DL) | 325 (DL) |
| D | 500 (DL) | 500 (DL) | 300 (DL) |

DL = SMC Delaminated
SB = SMC Sample Broke

EXAMPLE 9

The epoxy resin component of Example 2 and the amine hardener component of Example 4 were mixed in a weight ratio of 1.5:1 and the mixture rapidly developed non-sagging character. This adhesive was applied to SMC panels in accordance with the procedures given above, and the test results are given in Table 4.

TABLE 4

| Test Procedure | *Lap Shear Strength (psi) |
| --- | --- |
| A | 526 |
| A | 550 |
| A | 546 |
| B | 422 |
| B | 520 |
| B | 545 |
| B | 464 |
| C | 510 |
| C | 636 |
| C | 556 |

*In all samples the SMC Delaminated

EXAMPLE 10

A hardener component solution of 200 g of poly (propylene oxide) triamine(molecular weight 5000), 25 g of bis-phenol-A and 56 g of tris (dimethylaminomethyl) phenol was filled with 149 g of kaophile-2 filler. This gravity flow liquid was mixed with epoxy resin component of Example 2 in weight ratios of 1:1 and 1:1.5. These mixtures having excellent sag-resistance were used to prepare the lap shear adhesive bonds with SMC, by following the general procedure described earlier. The bonds were tested and the test results are given in the following Table.

|  |  | Lap Shear Strength (psi) | |
| --- | --- | --- | --- |
| Sample No. | Test Procedure | 1:1 | 1:1.5 |
| 1 | A | 558 DL | 572 DL |
| 2 | A | 555 DL | 548 DL |
| 3 | A | 570 DL | 560 DL |
| 4 | B | 700 DL | 620 DL |
| 5 | B | 575 DL | 646 DL |
| 6 | B | 630 DL | 610 DL |
| 7 | C | 521 DL | 671 DL |
| 8 | C | 484 DL | 600 DL |
| 9 | C | 535 DL | 545 DL |

DL = SMC Delamination

I claim:

1. A two-component structural adhesive comprising a first epoxy component composed of an epoxy resin containing from 0.5 to 8% by weight based on the epoxy resin of fumed silica, said epoxy resin containing more than one group of the formula

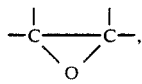

and a second hardener component containing from 20 to 50% by weight of kaolin, said hardener component also containing a member selected from the group consisting of (A) the reaction product of bis-(amino proply) piperazine and dimerized linoleic acid, amino ethyl piperazine, poly (propylene ether) diamine, bis phenol-A, (B) the reaction product of ethylene diamine with dimerized linoleic acid, bis phenol-A, amino ethyl piperazine, poly (propylene ether) diamine, bis (amino proply) piperazine (C) poly (propylene ether) diamine, bis phenol-A, (D) the reaction product of bis (amino propyl) piperazine and dimerized linoleic acid, amino ethyl piperazine, poly (propylene ether) diamine, bis phenol-A, and (E) the reaction product of ethylene diamine with linoleic acid, bis phenol-A, amino ethyl piperazine, poly (propylene ether) diamine, bis (amino propyl) piperazine.

2. The adhesive of claim 1 wherein the epoxy component contains a rubber or urethane elastomer.

3. The adhesive of claim 2 wherein the epoxy component is composed of the diglycidyl ether of bisphenol-A, a carboxylic acid terminated butadiene/acrylonitrile copolymer, triphenyl phosphine, and talc.

4. The adhesive of claim 1 wherein the hardener component is composed of (A) the reaction product of bis-(asinopropyl) piperazine and dimerized linoleic acid, amino ethyl piperazine, poly (propylene ether) diamine, bisphenol-A.

5. The adhesive of claim 1 wherein the hardener component is composed of (B) the reaction product of ethylene diamine with dimerized linoleic acid, bisphenol-A, aminoethyl piperazine, poly (propylene ether) diamine, bis(aminopropyl) piperazine.

6. The adhesive of claim 1 wherein the hardener component is composed of (C) poly (propylene ether) diamine, bis-phenol-A.

7. The adhesive of claim 3 wherein the hardener component is composed of (D) the reaction product of bis-(amino propyl) piperazine and dimerized linoleic acid, amino ethyl piperazine, poly (propylene ether) diamine, bis-phenol-A.

8. The adhesive of claim 3 wherein the hardener component is composed of (E) the reaction product of ethylene diamine with dimerized linoleic acid, bisphenol-A, amino ethyl piperazine, poly (propylene ether) diamine, bis (amino propyl) piperazine.

* * * * *